(12) United States Patent
Raj

(10) Patent No.: US 6,542,134 B1
(45) Date of Patent: *Apr. 1, 2003

(54) PROJECTION SYSTEM

(75) Inventor: Kannan Raj, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/275,746

(22) Filed: Mar. 24, 1999

(51) Int. Cl.$^7$ .................................................. G09G 3/00
(52) U.S. Cl. .............................. 345/32; 359/15; 349/25
(58) Field of Search ............................. 345/32; 359/15, 359/629, 633, 634, 639; 353/31; 349/25, 57

(56) References Cited

U.S. PATENT DOCUMENTS

| | | | | |
|---|---|---|---|---|
| 4,012,108 A | * | 3/1977 | Ishii et al. ........................ | 359/3 |
| 4,837,843 A | * | 6/1989 | Owechko ...................... | 382/211 |
| 4,988,154 A | * | 1/1991 | Hansen .......................... | 359/22 |
| 5,258,860 A | * | 11/1993 | Schehrer et al. ................ | 359/6 |
| 5,404,234 A | | 4/1995 | Taniguchi et al. | |
| 5,617,227 A | * | 4/1997 | Tocnaye et al. ............... | 349/57 |
| 5,696,714 A | * | 12/1997 | Russell ........................ | 365/106 |
| 5,808,800 A | | 9/1998 | Handschy et al. | |
| 5,894,359 A | * | 4/1999 | Suzuki et al. ................. | 359/15 |
| 6,038,005 A | * | 3/2000 | Handschy et al. ............ | 349/61 |

FOREIGN PATENT DOCUMENTS

| | | |
|---|---|---|
| EP | 0 825 462 A1 | 2/1998 |
| WO | WO 97/13175 | 4/1997 |

OTHER PUBLICATIONS

Patent Abstracts of Japan, Publication No. 09197340 (Jul. 31, 1997).
Patent Abstracts of Japan, Publication No. 10312034 (Nov. 24, 1998).

* cited by examiner

*Primary Examiner*—Bipin Shalwala
*Assistant Examiner*—Ricardo Osorio
(74) *Attorney, Agent, or Firm*—Trop, Pruner & Hu, P.C.

(57) ABSTRACT

A projection system includes at least one light source, at least one light modulator and a holographic beam splitter. The light source(s) are adapted to furnish unmodulated beams of light, and each unmodulated beam of light is associated with a different color channel. Each light modulator is associated with a different one of the unmodulated beams of light and is adapted to modulate the associated unmodulated beam of light to produce a modulated beam of light. The holographic beam splitter is adapted to direct each of the unmodulated beams of light to the associated light modulator.

21 Claims, 3 Drawing Sheets

PROJECTION SYSTEM

BACKGROUND

The invention generally relates to projection systems, and more particularly, the invention relates to a projection system that includes a holographic beam splitter.

An ever-increasing number of applications are using display devices that are derived from a combination of liquid crystal optics technology and semiconductor technology. For example, these display devices may be used in mobile telephones, projection systems, home entertainment systems and monitors for personal computers.

One such display device is a spatial light modulator (SLM) that may be used in a projection system to form a modulated beam image. For color projection systems, the system may have one SLM for each primary color channel (red, green and blue (RGB) primary color channels, as examples) of the projection system. As an example, to form a projected multicolor image, one SLM may modulate a red beam (of the red channel) to form a red modulated beam image, one SLM may modulate a green beam (of the green channel) to form a green modulated beam image, and another SLM may modulate a blue beam (of the blue channel) to form a blue modulated beam image. In this manner, the red, green and blue modulated beam images combine on a projection screen to form the multicolor image.

Conventional projection systems may include optics to keep the beams of the different color channels separated. For example, referring to FIG. 1, a conventional reflective projection system 10 may include a light source 28 that generates a beam of white light. For purposes of separating the beam of white light into its primary red, green and blue beams (of the different color channels), the projection system 10 may include dichroic beam splitters 12 and 16. In this manner, the dichroic beam splitter 12 may separate a red beam, for example, from the white beam of light. A mirror 13 may reflect the red beam to a polarizing beam splitter 19 that, in turn, reflects the red beam to a reflective SLM 14 that modulates the red beam. The polarizing beam splitter 19 directs the resultant green modulated beam of light to an X-cube prism 24 that directs the modulated beam through projection optics 26 to form one component of the multicolor image, the green modulated beam image, on a projection screen (not shown). The projection system 10 typically includes additional optical devices, such as the dichroic beam splitter 16, and polarizing beam splitters 17 and 22 to direct the unmodulated green and blue beams (from the original white beam) to an SLM 18 and an SLM 20, respectively. The polarizing beam splitters 17 and 22 and the X-cube prism 24 direct the resultant green and blue modulated images through the projection optics 26 to form the remaining components of the multicolor image.

An example of a more compact conventional projection system 30 is depicted in FIG. 2. The projection system 30 uses a folded optics system that is formed from prism blocks 32, 34 and 36. In this manner, a light source 46 generates a white beam of light that is directed via a polarizing beam splitter 44 toward the prism blocks 32, 34 and 36. Dichroic optical coatings 35 and 41 may be used on some of the prism block faces to maintain the separation of the different color channels and to divide the white beam of light into the its primary red, green and blue beams. In this manner, the dichroic optical coatings 35 and 41 direct the red, green and blue beams of light to an SLM 38, SLM 40 and SLM 42, respectively. Once modulated, the modulated beams of light follow optical paths near (but in the reverse order) to the paths followed by the associated unmodulated incident beams of light to return to the polarizing beam splitter 44. The polarizing beam splitter 44, in turn, directs the modulated beams through projection optics 48 to form a multicolor image on a projection screen (not shown).

Unfortunately, the dichroic beam splitters may be quite expensive, and the filtering by the dichroic beam splitters may remove a large amount of light. Furthermore, the dichroic beam splitters are one of a number of optical devices that may make alignment of the modulated beam images cumbersome during calibration of the system 10, 30 and may introduce a significant amount of light loss due to the large number of reflective surfaces.

Thus, there is a continuing need for a system that addresses one or more of the problems stated above.

SUMMARY

In one embodiment of the invention, a projection system includes at least one light source, at least one light modulator and a holographic beam splitter. The holographic beam splitter is adapted to establish optical communication between the light source(s) and the light modulator(s).

In another embodiment, a projection system includes at least one light source, at least one light modulator and a holographic beam splitter. The light source(s) are adapted to furnish unmodulated beams of light, and each unmodulated beam of light is associated with a different color channel. Each light modulator is associated with a different one of the unmodulated beams of light and is adapted to modulate the associated unmodulated beam of light to produce a modulated beam of light. The holographic beam splitter is adapted to direct each of the unmodulated beams of light to the associated light modulator.

In another embodiment, a method includes furnishing reference waves of light and recording interference patterns. Each reference wave of light is associated with a different color channel, and each of the interference patterns is associated with a different one of the reference waves of light. The interference patterns are used to produce object waves of light, and each of the object waves is associated with a different one of the color channels. The object waves are modulated to produce modulated light waves.

In yet another embodiment, a beam splitter includes a holographic medium that is adapted to receive beams of light that are associated with different color channels. The medium is adapted to direct the beams of light along optical paths that are situated at different angles based on the associated color channels.

DETAILED DESCRIPTION

Figure 1:
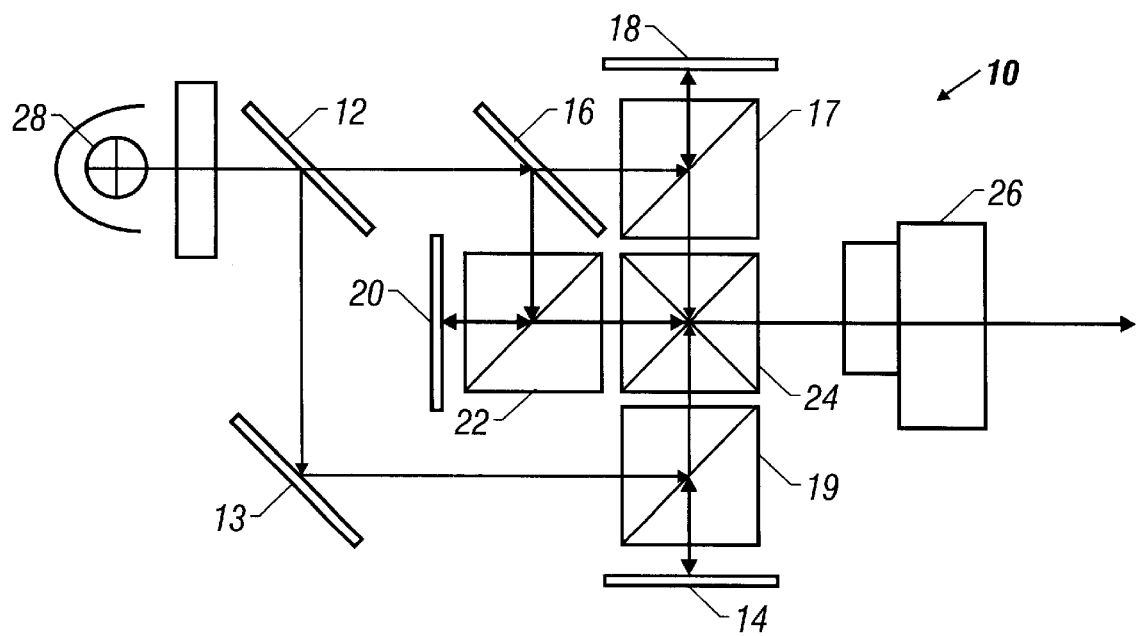
FIGS. 1 and 2 are schematic diagrams of projection systems of the prior art.
Figure 2:
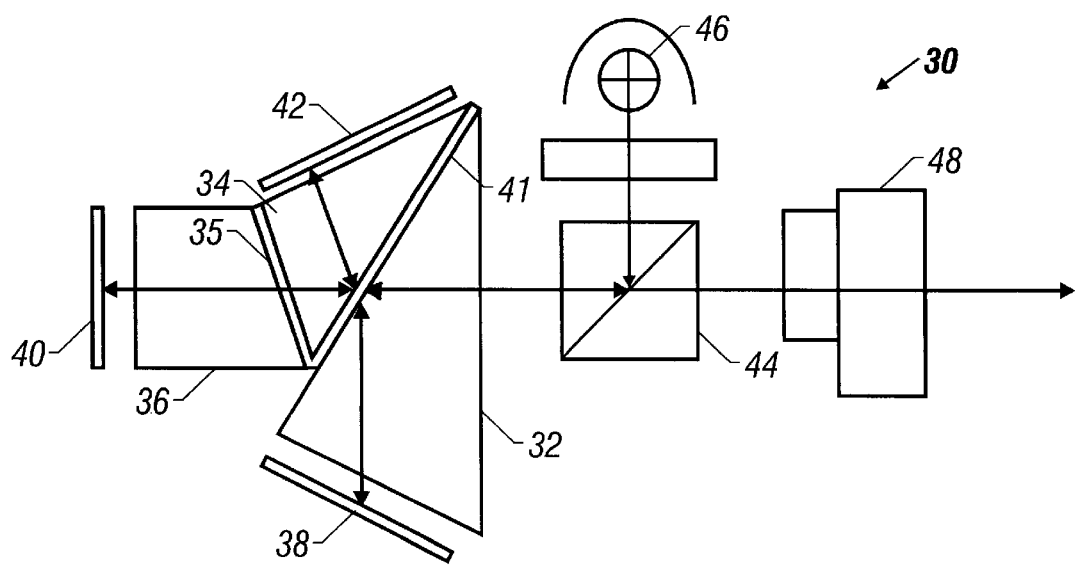
Figure 3:
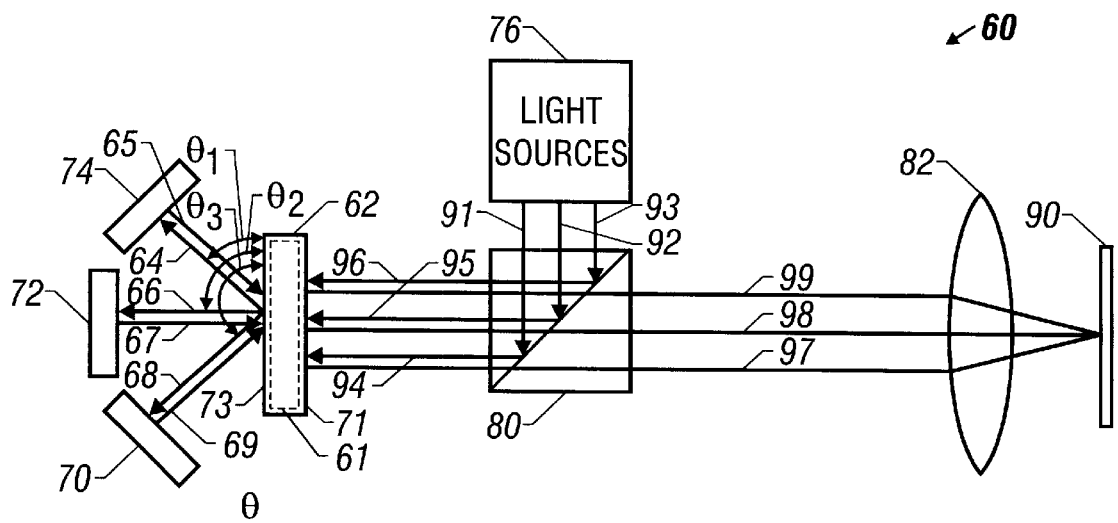
FIG. 3 is a schematic diagram of a projection system according to an embodiment of the invention.

Referring to FIG. 3, an embodiment 60 of a projection system in accordance with the invention includes light sources 76 that generate unmodulated beams of light, each of which is associated with a particular primary color channel and thus, a particular range of wavelengths. As an example, one of the unmodulated beams may include spectral components that have wavelengths that are associated with the color red, and as a result, the unmodulated beam (hereinafter called a red unmodulated beam) is associated with a red color channel. Similarly, another one of the beams (called a blue unmodulated beam) may be associated with a blue color channel, and another one of the light beams (called a green unmodulated beam) may be associated with a green color channel. The red, green and blue unmodulated beams follow respective optical paths 91, 92 and 93 to a polarizing beam splitter 80 The polarizing beam splitter 80, in turn, changes the courses of the unmodulated beams to direct the beams along respective optical paths 94, 95 and 96 toward the general direction of spatial light modulators (SLMs) 70, 72 and 74. One or more of the SLMs 70, 72 and 74 may include a liquid crystal display (LCD) panel, and the light sources 76 may include, as examples, one or more lasers and/or one or more light emitting diodes (LEDs).

A conventional projection system may include several optical devices that are located between the light sources 76 and the SLMs 70, 72 and 74, for purposes of controlling optical communication between the color channels and the SLMs. However, unlike the conventional projection systems, in some embodiments, the projection system 60 includes a holographic beam splitter 62, a single optical device (in some embodiments), that controls bi-directional communication between the color channels and the SLMs 70, 72 and 74.

More particularly, the holographic beam splitter 62 diffracts each beam based on the wavelengths of the spectral components of the beam, i.e., the holographic beam splitter 62 diffracts each beam based on its associated color channel. The diffraction imposed by the holographic beam splitter 62 is different for the beams of each color channel, a characteristic that may be used to cause the unmodulated beams to exit the holographic beam splitter 62 along diverging separate optical paths 64 (for the blue color channel), 66 (for the green color channel) and 68 (for the red color channel), as described below.

For example, the red unmodulated beam, similar to the other unmodulated beams, enters an incident face 71 of the holographic beam splitter 62 along the optical path 94 that is substantially angularly aligned to a normal of the face 71. An angle (called $\theta_3$) at which the red unmodulated beam exits an opposite face 73 of the holographic beam splitter 62 is controlled by an interference pattern (called a hologram) that is associated with the red color channel and is stored in the holographic beam splitter 62. In this manner, the hologram diffracts the incident red unmodulated beam to cause the beam to exit the face 73 at the $\theta_3$ angle (and follow the optical path 68).

Similarly, the holographic beam splitter 62 stores holograms that are associated with the green and blue color channels. These holograms diffract the green and blue unmodulated beams to cause the green and blue unmodulated beams to exit the face 73 at angles called $\theta_2$ and $\theta_1$ and follow the respective optical paths 66 and 64. Thus, each hologram is associated with a particular color channel, and because each hologram is highly wavelength selective, the hologram does not diffract beams that are associated with the other color channels.

Once modulated by one of the SLMs 70, 72 and 74, the resultant modulated beam returns along a similar path to the incident unmodulated beam to the polarizing beam splitter 80. More particularly, the red, green and blue modulated beams follow respective optical paths 69, 67 and 65 that substantially follow (in reverse directions) the respective optical paths 68, 66 and 64 of the red, green and blue unmodulated beams. For example, the SLM 70 modulates the red unmodulated beam to produce a red modulated beam that follows the optical path 69 in its return to the holographic beam splitter 62. Because the red modulated beam enters the face 73 of the holographic beam splitter 62 at approximately the $\theta_3$ angle (i.e., the angle at which the red unmodulated beam exits the face 73), the red modulated beam exits the face 71 of the holographic beam splitter 62 along an optical path 97 that approximately follows (in a reverse direction) the optical path 94 that is followed by the red unmodulated beam. Similarly, the green and blue modulated beams exit the face 71 along respective optical paths 98 and 99 that approximately follow (in reverse directions) the optical paths 95 and 96 of the green and blue unmodulated beams. The red, green and blue modulated beams follow the optical paths 96, 95 and 94 through the polarizing beam splitter 80 and to projection optics 82 that form red, green and blue modulated beam images that combine on a projection screen 90 to form a multicolor composite image.

The advantages of the above-described projection system may include one or more of the following: the cost of the projection system may be substantially reduced; alignment of optical devices in the projection system may be simplified; the holographic beam splitter may be easy to mass produce; dichroic filters may not be needed; power may be conserved; color fidelity may be effectively controlled; optical light throughput may increase; and the projection system may be compact.

Figure 4:
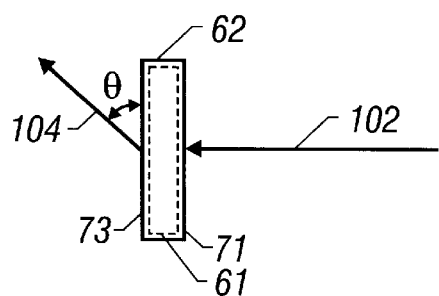
FIG. 4 illustrates a technique to reconstruct an object wave from a hologram.

Referring to FIG. 4, the holographic beam splitter 62 may include a volume recording medium 61 to store at least three holograms, each of which is used to diffract the beams of a different color channel. In general, the stored hologram permits a reconstructed object wave 104 (such as the red unmodulated beam, for example, when exiting the face 73 of the holographic beam splitter 62) to be formed by projecting a reference wave 102 (such as the red unmodulated beam when entering the face 71 of the holographic beam splitter 62, for example) onto the face 71.

Figure 5:
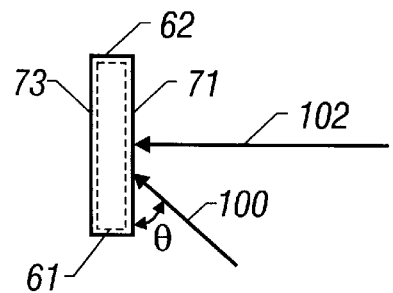
FIG. 5 illustrates a technique to record the hologram.

The recording of each hologram may be performed separately from the recording of the other holograms to prevent "washes" from being recorded in the holograms, and the recording of each hologram (for a particular color channel) may be performed in the following manner. Referring to FIG. 5, a reference wave 102 that is associated with the particular color channel is projected onto the face 71 of the holographic beam splitter 62.

As an example, in some embodiments, the reference wave 102 may be substantially angularly aligned with a normal of the face 71, and the reference 102 and object 100 waves may be formed by, as examples, light emitting diodes (LEDs) or lasers that emit light having spectral components having wavelengths that are associated with the particular color channel.

For example, to form the hologram for the blue color channel, an LED or laser may project a blue beam toward the face 71 to form the reference wave 102. Another LED or laser may be used to project another blue beam toward the face 71 at an angle called $\theta$ (as shown in FIG. 5) to form the object wave 100. The angle $\theta$ determines the course of the optical path 64, the optical path followed by the blue modulated beam (i.e., the reconstructed object wave 104

(see FIG. 4)). The holograms that are associated with the red and green color channels may be recorded in a similar manner.

Mathematically, a hologram for a particular color channel may be described by the following equation:

$$H=|O+R|^2=|O|^2+|R|^2+OR^*+O^*R, \quad (1)$$

where the suffix "*" represents a conjugate, "O" represents the object wave 100 and "R" represents the reference wave 102. During reconstruction, the hologram is illuminated with the reference wave 102 again to cause the hologram to diffract the reference wave 102 to produce the reconstructed object wave 104 that is mathematically described below:

$$O_R=H^*R=|O+R|^2{}^*R=R|O|^2+R|R|^2+O|R|^2O^*R^2, \quad (2)$$

where "$O_R$" denotes the reconstructed object wave 104. If R=1, then the third term in equation (2) is the original object wave 100, and the remaining light is split up among the other latter three terms. Although, the latter three terms may effect the reconstruction of the object wave 100 for an amplitude hologram, in some embodiments, the hologram recorded in the holographic beam splitter 62 is a phase-only hologram, a hologram that effectively surpresses the latter three terms of equation (2) and results in little light being wasted. The holographic volume recording medium that is used in the holographic beam splitter 62 may be thin or thick and in some embodiments, is a few millimeters thick.

Figure 6:
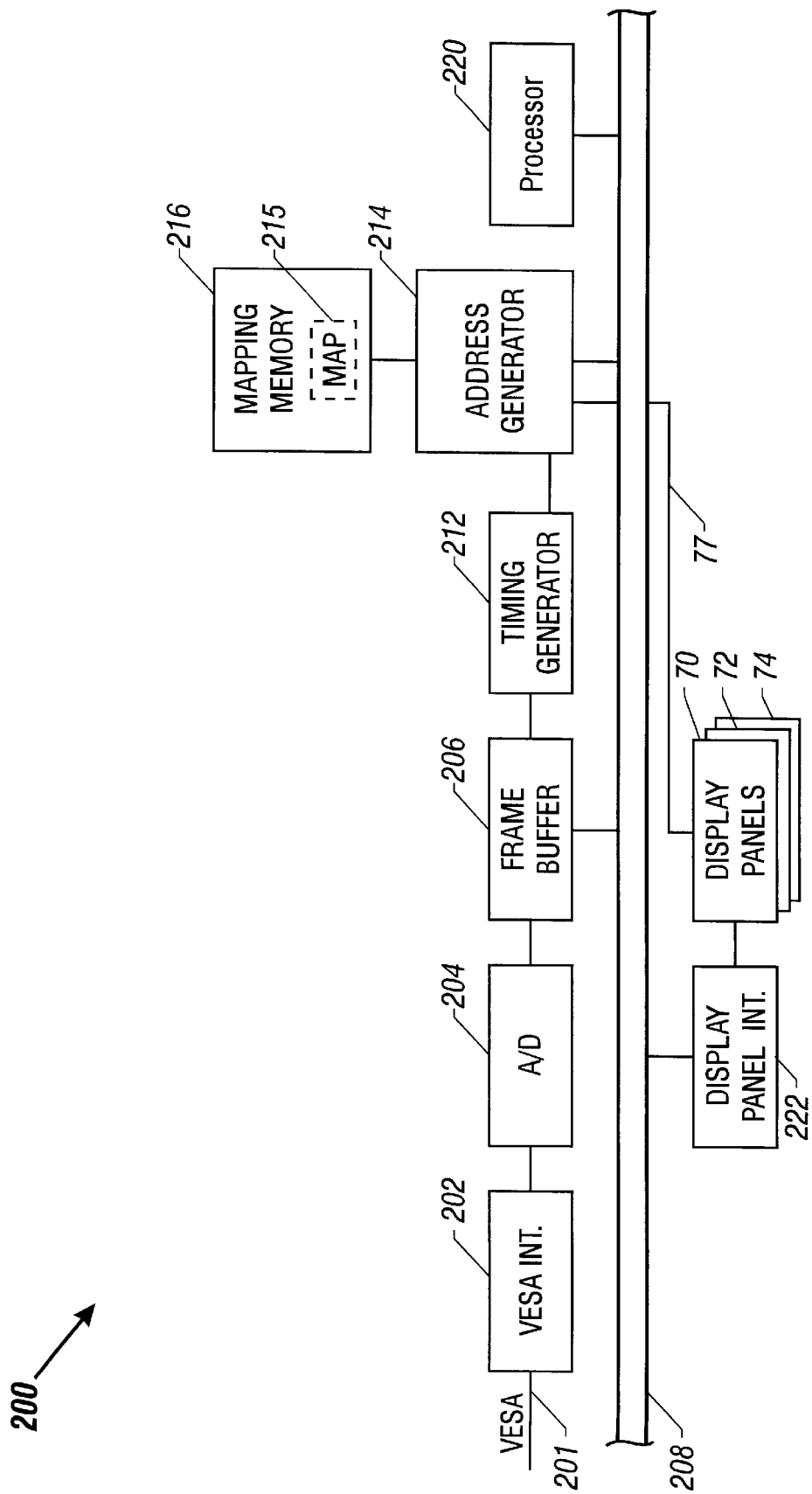
FIG. 6 is a schematic diagram of an electrical system of the projection system of FIG. 3 according to an embodiment of the invention.

Referring to FIG. 6, the projection system 60 may include the following electrical system 200 that may be part of a computer system, for example, or part of a stand-alone projector. In particular, the electrical system 200 may include a Video Electronics Standards Association (VESA) interface 202 to receive analog signals from a VESA cable 201. The VESA standard is further described in the Computer Display Timing Specification, v.1, rev. 0.8 that is available on the Internet at www.vesa.org/standards.html. These analog signals indicate images to be formed by the display panels 70, 72 and 74 and may be generated by a graphics card of a computer, for example. The analog signals are converted into digital signals by an analog-to-digital (A/D) converter 204, and the digital signals are stored in a frame buffer 206. A timing generator 212 may be coupled to the frame buffer 206 and regulate a frame rate at which images are formed on the screen 59. A processor 220 (one or more central processing units (CPUs), microcontrollers or microprocessors, as examples) may be coupled to the frame buffer 206 via a bus 208.

The processor 220 may process the data stored in the frame buffer 206 to produce indications of the images to be formed on the SLMs 70, 72 and 74. As examples, the processor 220 may transform the coordinate space used by the graphics card into the coordinate space used by the SLMs 70, 72 and 74, remap the color space used by the graphics card into the color space used by the SLMs 70, 72 and 74 and cause the data to conform to the gamma function of the SLMs 70, 72 and 74. The end product of these operations is a set of RGB values for each pixel of the image. In this manner, the R values may be used to form the intensity values of the pixels of the SLM 70, the G values may be used to form the intensity values of the pixels of the SLM 72 and the B values may be used to form the intensity values of the pixels of the SLM 74.

Among the other features of the system 200, the system 200 may include a display panel interface 222 that is coupled to the bus 208 and drive voltages to form the images on the SLMs 70, 72 and 74 in response to signals that are furnished by an address generator 214. A map 215 (stored in a mapping memory 216) indicates a desired mapping transformation between pixel cells of the SLMs 70, 72 and 74 and pixels of the corresponding images that are displayed by the SLMs 70, 72 and 74. The map 215, in turn, may be used by the address generator 214 to generate the pixel addresses for the pixel cells of the SLMs 70, 72 and 74.

Other embodiments are within the scope of the following claims. For example, in some embodiments, the SLM may be replaced by a silicon grating modulator (also called a grating light valve). As another example, the holographic beam splitter 62 may store holograms for additional color channels, such as a fourth color channel, for example, that may be used to establish bidirectional communication between the screen 90 and image sensors. In this manner, the fourth color channel may be an infrared color channel, and an infrared filter may be attached to permit infrared light to be received from the screen 90 along an optical path that is in the opposite direction to the optical paths 94, 95 and 96. The holographic beam splitter 62 directs the infrared light to an imager (of the projection system) for purposes of decoding the infrared control signals. Thus, a viewer of the screen 90 may operate a remote control to send infrared control signals toward the screen 90 and therefore, interactively communicate with the projection system.

As another example, in some embodiments, the light sources 76 may be replaced by fewer or more light sources. For example, in some embodiments, a single light source, such as an arc lamp, may be used with dichroic mirrors to produce the red, green and blue unmodulated beam images.

As yet another example, in some embodiments, only one SLM may be used in conjunction with a pulsing technique that causes the red, green and blue unmodulated beams to be individually and sequentially projected upon the SLM in a time multiplexed fashion. In this manner, during the time slice when the SLM modulates the red unmodulated beam, the SLM receives electrical signals that indicate the modulation for the red color channel; during the time slice when the SLM modulates the green unmodulated beam, the SLM receives electrical signals that indicate the modulation for the green color channel; etc.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A projection system comprising:
    at least one light source to furnish light comprising multiple color channels;
    a first light modulator associated with one of the color channels;
    a second light modulator associated with another one of the color channels, the second light modulator being separate from the first light modulator; and
    a holographic beam splitter comprising a substantially planar medium including multiple recorded interference patterns to selectively establish a first optical path for said one of the color channels between the beam splitter and the first light modulator in response to a wavelength associated with said one of the color channels and establish a second optical path for said another one of the color channels between the beam splitter and the second light modulator in response to a wavelength associated with said another one of the color channels.

2. The projection system of claim 1, further comprising:
projection optics, and
wherein the holographic beam splitter is further adapted to establish optical communication between the first and second light modulators and the projection optics to produce a composite image.

3. The projection system of claim 1, wherein
said at least one light source is adapted to produce unmodulated beams of light, and
the unmodulated beams of light are associated with at least three of the color channels.

4. The projection system of claim 1, wherein
said at least one light source is adapted to produce unmodulated beams of light, and
the unmodulated beams of light are associated with at least four of the color channels.

5. The projection system of claim 1, wherein each of the different paths is associated with a different one of the color channels.

6. The projection system of claim 1, wherein the paths form different exit angles relative to the beam splitter.

7. A projection system comprising:
at least one light source to furnish unmodulated beams of light, each unmodulated beam of light being associated with a different color channel;
a first light modulator associated with one of the unmodulated beams of light and being adapted to modulate said one of the unmodulated beams of light to produce a first modulated beam of light;
a second light modulator associated with another one of the unmodulated beams of light and being adapted to modulate said another one of the unmodulated beams of light to produce a second modulated beam of light, the second light modulator being separate from the first light modulator; and
a holographic beam splitter comprising a substantially planar medium including multiple recorded interference patterns to selectively establish a first optical path for said one of the unmodulated beams of light between the beam splitter and the first light modulator in response to a wavelength associated with said one of the unmodulated beams of light and establish a second optical path for said another one of the other unmodulated beams of light between the beam splitter and the second light modulator in response to a wavelength associated with said another one of the unmodulated beams of light.

8. The projection system of claim 7, further comprising:
projection optics,
wherein the holographic beam splitter is further adapted to direct the modulated beams of light to the projection optics to form a composite image.

9. The projection system of claim 7, wherein the holographic beam splitter comprises:
a phase-based holographic beam splitter.

10. The projection system of claim 7, wherein the unmodulated beams of light are associated with at least three of the color channels.

11. The projection system of claim 7, wherein the unmodulated beams of light are associated with at least four of the color channels.

12. The projection system of claim 7, wherein said at least one light source comprises:
a light emitting diode.

13. The projection system of claim 7, wherein said at least one light source comprises:
a laser.

14. The projection system of claim 7, wherein at least one of the first and second light modulators comprises:
a liquid crystal display panel.

15. The projection system of claim 7, wherein each of the different paths is associated with a different one of the color channels.

16. The projection system of claim 7, wherein the paths form different exit angles relative to the beam splitter.

17. A method comprising:
furnishing reference waves of light, each reference wave of light being associated with a different color channel;
on a substantially planar recording medium recording interference patterns, each of the interference patterns being associated with a different one of the reference waves of light;
using the interference patterns to produce object waves of light, each of the object waves being associated with one of the color channels;
directing the reference waves to separate light modulators, each of the light modulators being associated with one of the color channels; and
modulating the object waves to produce modulated light waves.

18. The method of claim 17, wherein the act of modulating the object waves comprises:
directing the modulated light waves to optics to form a multicolor image.

19. The method of claim 18, wherein the act of directing comprises:
using the interference patterns.

20. The method of claim 17, wherein the act of furnishing comprises:
using lasers to furnish the reference waves of light.

21. The method of claim 17, wherein the act of furnishing comprising:
using light emitting diodes to furnish the reference waves of light.

* * * * *